(12) United States Patent
Gao

(10) Patent No.: US 11,161,448 B2
(45) Date of Patent: Nov. 2, 2021

(54) FACE DETECTION-BASED BULB TYPE ALARM LAMP

(71) Applicant: Ningbo Kaishuo Lighting Technology Co., Ltd., Yuyao (CN)

(72) Inventor: Yanhua Gao, Yuyao (CN)

(73) Assignee: YUYAO HENGZHENG METALWARE CO., LTD., Zhejiang (CN)

( * ) Notice: Subject to any disclaimer, the term of this patent is extended or adjusted under 35 U.S.C. 154(b) by 231 days.

(21) Appl. No.: 16/336,192

(22) PCT Filed: Jun. 30, 2017

(86) PCT No.: PCT/CN2017/091150
§ 371 (c)(1),
(2) Date: Mar. 25, 2019

(87) PCT Pub. No.: WO2018/223457
PCT Pub. Date: Dec. 13, 2018

(65) Prior Publication Data
US 2019/0283657 A1 Sep. 19, 2019

(30) Foreign Application Priority Data
Jun. 6, 2017 (CN) .......................... 201710418133.4

(51) Int. Cl.
*G06K 9/00* (2006.01)
*B60Q 1/00* (2006.01)
(Continued)

(52) U.S. Cl.
CPC .......... *B60Q 1/0023* (2013.01); *B60Q 1/2611* (2013.01); *B60Q 1/46* (2013.01);
(Continued)

(58) Field of Classification Search
CPC .... B06Q 1/0023; B06Q 1/2611; B06Q 1/146; F21S 10/00; F21V 15/02; F21V 19/00; F21V 23/003; G06K 9/00234
See application file for complete search history.

(56) References Cited

FOREIGN PATENT DOCUMENTS

| CN | 201797552 U | 4/2011 |
|---|---|---|
| CN | 102887106 A | 1/2013 |

(Continued)

OTHER PUBLICATIONS

International Search Report and Written Opinion for corresponding international application No. PCT/CN2017/091150, dated Feb. 24, 2018.

*Primary Examiner* — Anabel Ton
(74) *Attorney, Agent, or Firm* — Tarolli, Sundheim, Covell & Tummino LLP

(57) ABSTRACT

A face detection-based bulb type alarm lamp includes a folding mounting base, an explosion-proof net container, a releasing device, a red bulb, a blue bulb, and a DSP chip. The folding mounting base is used for fixing the red bulb (4) and the blue bulb (5); the explosion-proof net container is used for containing an explosion-proof net; the releasing device is disposed at the rear end of the explosion-proof net container for use of release, when receiving an emission control signal, the explosion-proof net in the explosion-proof net container based on the emission control signal. The function of the bulb type alarm lamp is extended, thereby facilitating use by the police.

5 Claims, 1 Drawing Sheet

(51) Int. Cl.
*B60Q 1/26* (2006.01)
*B60Q 1/46* (2006.01)
*F21S 10/00* (2006.01)
*F21V 15/02* (2006.01)
*F21V 19/00* (2006.01)
*F21V 23/00* (2015.01)

(52) U.S. Cl.
CPC .............. *F21S 10/00* (2013.01); *F21V 15/02* (2013.01); *F21V 19/001* (2013.01); *F21V 23/003* (2013.01); *G06K 9/00234* (2013.01)

(56) References Cited

FOREIGN PATENT DOCUMENTS

| | | | |
|---|---|---|---|
| CN | 104202528 A | * | 12/2014 |
| CN | 104202528 A | | 12/2014 |
| CN | 106403719 A | * | 2/2017 |
| CN | 106403719 A | | 2/2017 |
| CN | 206023978 U | | 3/2017 |
| CN | 206209759 U | | 5/2017 |
| KR | 20010088971 A | | 9/2001 |

\* cited by examiner

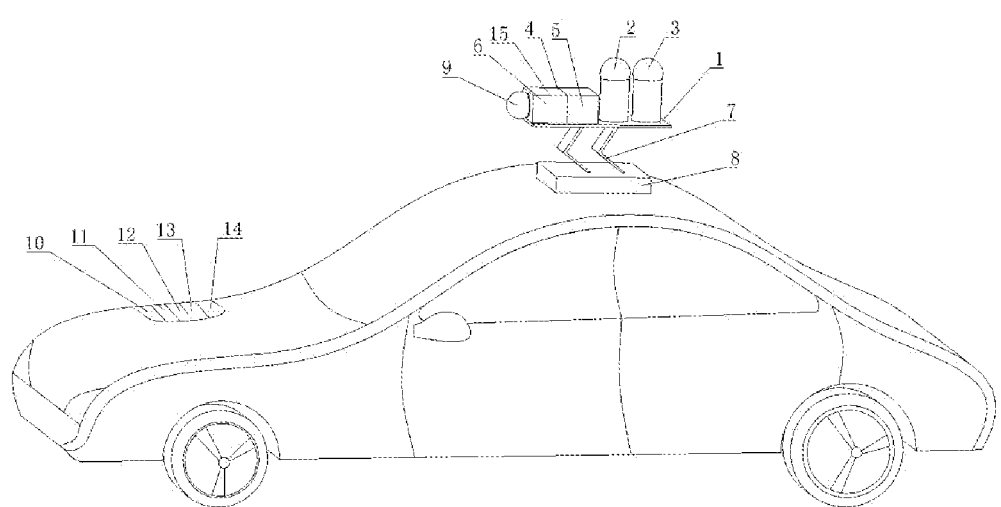

FACE DETECTION-BASED BULB TYPE ALARM LAMP

RELATED APPLICATIONS

The present invention is a U.S. National Stage under 35 USC 371 patent application, claiming priority to Serial No. PCT/CN2017/091150, filed on 30 Jun. 2017; which claims priority of CN 201710418133.4, filed on 6 Jun. 2017, the entirety of both of which are incorporated herein by reference.

FIELD OF THE INVENTION

The present invention relates to the field of bulb type alarm lamps, and more particularly to a face detection-based bulb type alarm lamp.

BACKGROUND OF THE INVENTION

In general, conventional alarm lamp products have the following features. 1. High lighting efficiency and energy saving: For example, an extremely high brightness solid-state maintenance-free LED light source may be selected as the light source to achieve high lighting efficiency, long service life, and good power saving and environmental protection effects. 2. Excellent core circuit design: Two operating modes including a sound mode and a light and sound mode can be switched freely, and the sound intensity of the alarm is up to 115 decibels, and thus the penetration ability is powerful. 3. Rechargeable battery: For example, high-energy non-memory battery packs can be used to achieve stable charging/discharging performance, high capacity, low self-discharge rate, and good power saving and environmental protection effects. 4. High safety and reliability: Advanced optical software and optimized structural sealing design may be used, wherein the casing is made of imported engineering plastics capable of resisting strong collisions and impacts, so as to ensure a long-term reliable operation of the lamp even in a harsh environment. 5. Other features: The alarm lamp has the features of easy to use, small size, light weight, and easy to carry. In addition, the lamp can be put on a tabletop, hand-carried, magnetically attached, or mounted in different ways.

However, the conventional alarm lamps only have the function limited to warning by flashing light without any other assisting tools, and thus wasting the existing hardware resources of the conventional alarm lamp and failing to provide more assistance to police officers in police cars.

SUMMARY OF THE INVENTION

Therefore, it is a primary objective of the present invention to overcome the aforementioned drawbacks of the prior art by providing a face detection-based bulb type alarm lamp, wherein a folding mounting base, an explosion-proof net container, a releasing device and a plurality of designated image processing device are integrated into the face detection-based bulb type alarm lamp, so as to achieve the effects of confirming whether or not a captured image includes a criminal's facial feature. If the captured image includes the criminal's facial feature, the face detection-based bulb type alarm lamp conforms the emission direction based on a relative position of the captured image of a human sub-image, confirming the emission intensity based on the depth of field of the captured image of the human sub-image, and controlling the direction and force of releasing the explosion-proof net contained in the releasing device by the explosion-proof net container.

To achieve the aforementioned objective, the present invention provides a face detection-based bulb type alarm lamp, comprising: a folding mounting base, an explosion-proof net container, a releasing device, a red bulb, a blue bulb and a DSP controller, characterized in that the folding mounting base is provided for fixing the red bulb and the blue bulb; the explosion-proof net container is provided for containing the explosion-proof net; the releasing device is disposed at a rear end of the explosion-proof net container and provided for releasing the explosion-proof net contained in the explosion-proof net container according to an emission control signal when the emission control signal is received.

Wherein, the DSP controller is coupled to the folding mounting base, the explosion-proof net container, the releasing device, the red bulb and the blue bulb and provided for controlling the folding mounting base, the explosion-proof net container, the releasing device, the red bulb, and the blue bulb.

Wherein, the folding mounting base comprises a fastener, a folding element and a box, and the explosion-proof net container and the releasing device are embedded into the box of the folding mounting base.

Specifically, the DSP controller of the face detection-based bulb type alarm lamp is provided for controlling the folding mounting base, the explosion-proof net container, the releasing device, the red bulb and the blue bulb, which includes controlling a switch between a folded status and an unfolded status of the folding mounting base.

Specifically, the DSP controller of the face detection-based bulb type alarm lamp is provided for controlling the folding mounting base, the explosion-proof net container, the releasing device, the red bulb and the blue bulb, which includes controlling the flashing frequency of the red bulb and the flashing frequency of the blue bulb.

Specifically, the DSP controller of the face detection-based bulb type alarm lamp is provided for controlling the folding mounting base, the explosion-proof net container, the releasing device, the red bulb and the blue bulb, which includes controlling the releasing device to confirm whether or not the explosion-proof net contained in the explosion-proof net container is released.

Specifically, the face detection-based bulb type alarm lamp further comprises: a video capture device, embedded into a casing of the box of the folding mounting base, for collecting video data around the alarm lamp to obtain a high definition video stream; an edge enhancement device, coupled to the video capture device, for executing an edge enhanced image of a new frame image whenever the new frame image of the high definition video stream is received, so as to obtain a new enhanced image of the high definition video stream; a wavelet filter device, coupled to the edge enhancement device, for carrying out a Daubechies wavelet filter processing of a new enhanced image of the high definition video stream whenever the new enhanced image of the high definition video stream is received, so as to obtain a new filtered image of the high definition video stream; wherein, the Daubechies wavelet filter processing carried out by the wavelet filter device comprises: using a Daubechies wavelet with a length of 4 to carry out a level 3 decomposition of the new enhanced image of the high definition video stream and then a wavelet reconstruction to obtain a new filtered image of the high definition video stream; a background splitting device, coupled to the wavelet filter device, for processing each pixel of the new filtered image as a target pixel as follows, whenever the new filtered image of the high definition video stream is received: confirming whether or not the pixel value of the target pixel is matched with the pixel value of the pixel situated at a corresponding position of the foreground and background images; if yes, then using the target pixel as a background point, or else using the target pixel as a non-background point, calculating the probability of the pixel point at a corresponding position of the target pixel of the previous images in the high definition video stream being a background point, and if the probability is greater than or equal to the threshold of the predetermined probability, using the pixel value of the target pixel at the corresponding position in the previous images being confirmed as the background point to update the pixel value of the target pixel at a corresponding position in the foreground and background images; outputting an updated background image, after the background splitting device has executed the aforementioned processing of the last pixel in the new filtered image; a target identification device, coupled to the background splitting device, for subtracting the updated background image based on the new filtered image of the high definition video stream from the new filtered image of the high definition video stream to obtain a foreground image, matching a target in the foreground image based on the characteristics of a predetermined human color bar chart to confirm whether or not the target is a human target in the foreground image, and outputting a human sub-image corresponding to the human target and split from the foreground image.

Wherein, the DSP controller is coupled to the target identification device, for confirming whether or not the human sub-image includes a criminal's facial feature, and if the human sub-image includes the criminal's facial feature, confirming an emission direction based on a relative position of the foreground image of the human sub-image, confirming an emission intensity based on the depth of field of the foreground image of the human sub-image, and the DSP controller packing the emission direction and the emission intensity to form the emission control signal.

Specifically, the folding mounting base of the face detection-based bulb type alarm lamp is disposed at the top of a police car.

Specifically, the DSP controller of the face detection-based bulb type alarm lamp is installed in a frontend dashboard of a police car.

Specifically, the DSP controller of the face detection-based bulb type alarm lamp is provided for controlling the folding mounting base, the explosion-proof net container, the releasing device, the red bulb and the blue bulb, and the sum of the flashing frequency of the red bulb and the flashing frequency of the blue bulb is a predetermined value.

Specifically, the fastener of the folding mounting base of the face detection-based bulb type alarm lamp is provided for fixing the folding mounting base to the top of a police car.

Specifically, the folding element of the folding mounting base of the face detection-based bulb type alarm lamp is provided for folding or unfolding the folding mounting base to switch between a folded status and an unfolded status of the folding mounting base.

BRIEF DESCRIPTION OF THE DRAWING

FIG. 1 is a structural block diagram of a face detection-based bulb type alarm lamp in accordance with the present invention.

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

Special vehicles such as police cars, fire trucks, and ambulances may use a siren for a mission without the limitation of traffic light and may even be driven in a direction against the traffic, and pedestrians and other vehicles are obliged to make way for these special vehicles, provided that the siren is legally installed and issued for use, otherwise, in theory, there shall be penalties. This is the privilege of a special vehicle and a legitimate and reasonable privilege.

In addition, the police car must turn on the siren in the process of handling an emergency case, not only clearing the way for the police car to get to the crime scene in the first time only, but also playing an important role to scarce the suspect. In other words, the siren can scare away the suspect. In general, there is no warning in the emergency, policemen only have emergency plans for such an incidence, and it is impossible to have specific action deployments. In other words, the policemen simply rush to the location of emergency for rescue and try to minimize the damage caused by the incident instead of blindly chasing or arresting the suspect.

Since the function of an alarm lamp of a police car is fixed and lack of accessibility to give police officers a variety of assistance. For example, the conventional alarm lamp cannot identify a criminal quickly or use an explosion-proof net to arrest the criminal automatically. To overcome the aforementioned deficiencies, the present invention provides a face detection-based bulb type alarm lamp to overcome the aforementioned deficiency of the prior art.

With reference to FIG. 1 for a structural block diagram of a face detection-based bulb type alarm lamp in accordance with the present invention, the face detection-based bulb type alarm lamp comprises a folding mounting base 1, an explosion-proof net container 2, a releasing device 3, a red bulb 4, a blue bulb 5 and a DSP based controller (hereafter "DSP controller") 6, and the folding mounting base 1 is used for fixing the red bulb 4 and the blue bulb 5, and the explosion-proof net container 2 is used for containing an explosion-proof net 21, and the releasing device 3 is disposed at a rear end of the explosion-proof net container 2 for releasing the explosion-proof net 21 contained in the explosion-proof net container 2 based on an emission control signal produced by the DSP controller 6 when the emission control signal is received by the releasing device 3.

Wherein, the DSP controller 6 is coupled to the folding mounting base 1, the explosion-proof net container 2, the releasing device 3, the red bulb 4 and the blue bulb 5, and provided for controlling the folding mounting base 1, the explosion-proof net container 2, the releasing device 3, the red bulb 4 and the blue bulb 5;

Wherein, the folding mounting base 1 includes a fastener 11, a folding element 12 and a box 13, and the explosion-proof net container 2 and the releasing device 3 are embedded into the box 13 of the folding mounting base 1.

The specific structure of the face detection-based bulb type alarm lamp of the present invention is further described in details below.

In the face detection-based bulb type alarm lamp, the DSP controller 6 is provided for controlling the folding mounting base 1, the explosion-proof net container 2, the releasing device 3, the red bulb 4 and the blue bulb 5, which includes controlling a switch between a folded status and an unfolded status of the folding mounting base 1.

In the face detection-based bulb type alarm lamp, the DSP controller 6 is provided for controlling the folding mounting base 1, the explosion-proof net container 2, the releasing device 3, the red bulb 4 and the blue bulb 5, which includes controlling the flashing frequency of the red bulb 4 and the flashing frequency of the blue bulb 5.

In the face detection-based bulb type alarm lamp, the DSP controller 6 is provided for controlling the folding mounting base 1, the explosion-proof net container 2, the releasing device 3, the red bulb 4 and the blue bulb 5, which includes controlling the releasing device 3 to confirm whether the explosion-proof net 21 contained in the explosion-proof net container 2 is released.

In addition, the face detection-based bulb type alarm lamp further comprises a video capture device 71, embedded into a casing 13a of the box 13 of the folding mounting base 1, for collecting video data around the alarm lamp to obtain a high definition video stream; an edge enhancement device 72, coupled to the video capture device 71, for executing an edge enhanced image of a new frame image whenever the new frame image of the high definition video stream is received, so as to obtain a new enhanced image of the high definition video stream; a wavelet filter device 73, coupled to the edge enhancement device 72, for carrying out a Daubechies wavelet filter processing of a new enhanced image of the high definition video stream whenever the new enhanced image of the high definition video stream is received, so as to obtain a new filtered image of the high definition video stream; wherein, the Daubechies wavelet filter processing carried out by the wavelet filter device 73 comprises: using a Daubechies wavelet with a length of 4 to carry out a level 3 decomposition of the new enhanced image of the high definition video stream and then a wavelet reconstruction to obtain a new filtered image of the high definition video stream; a background splitting device 74, coupled to the wavelet filter device 73, for processing each pixel of the new filtered image as a target pixel as follows, whenever the new filtered image of the high definition video stream is received: confirming whether or not the pixel value of the target pixel is matched with the pixel value of the pixel situated at a corresponding position of the foreground and background images; if yes, then using the target pixel as a background point, or else using the target pixel as a non-background point, calculating the probability of the pixel point at a corresponding position of the target pixel of the previous images in the high definition video stream being a background point, and if the probability is greater than or equal to the threshold of the predetermined probability, using the pixel value of the target pixel at the corresponding position in the previous images being confirmed as the background point to update the pixel value of the target pixel at a corresponding position in the foreground and background images; outputting an updated background image, after the background splitting device has executed the aforementioned processing of the last pixel in the new filtered image; a target identification device 75, coupled to the background splitting device 74, for subtracting the updated background image based on the new filtered image of the high definition video stream from the new filtered image of the high definition video stream to obtain a foreground image, matching a target in the foreground image based on the characteristics of a predetermined human color bar chart to confirm whether or not the target is a human target in the foreground image, and outputting a human sub-image corresponding to the human target and split from the foreground image.

Wherein, the DSP controller 6 is coupled to the target identification device 75, for confirming whether or not the human sub-image includes a person (e.g., a criminal)'s facial feature, and if the human sub-image includes the criminal's facial feature, confirming an emission direction based on a relative position of the foreground image of the human sub-image, confirming an emission intensity based on the depth of field of the foreground image of the human sub-image, and the DSP controller 6 packing the emission direction and the emission intensity to form the emission control signal.

In the face detection-based bulb type alarm lamp, the folding mounting base 1 is disposed at the top of a police car 8.

In the face detection-based bulb type alarm lamp, the DSP controller 6 is installed in a frontend dashboard 81 of a police car 8.

In the face detection-based bulb type alarm lamp, the DSP controller 6 is provided for controlling the folding mounting base 1, the explosion-proof net container 2, the releasing device 3, the red bulb 4 and the blue bulb 5, and the sum of the flashing frequency of the red bulb 4 and the flashing frequency of the blue bulb 5 is a predetermined value.

In the face detection-based bulb type alarm lamp, the fastener 11 of the folding mounting base 1 is provided for fixing the folding mounting base 1 to the top of a police car 8.

In the face detection-based bulb type alarm lamp, the folding element 12 of the folding mounting base 1 is provided for folding or unfolding the folding mounting base 1 to switch between a folded status and an unfolded status of the folding mounting base 1.

Wherein, a DSP chip used in the DSP controller 6 adopts the Harvard architecture which separates programs from data, has specified hardware multipliers, and using pipeline operations extensively, providing special DS commands, so that the DSP chip is capable of implementing various digital signal processing (DSP) algorithms quickly.

According to the requirements of digital signal processing, a general DSP chip has the following features:

(1) One multiplication and one addition can be completed within an operating speed. (2) The program and data spaces are separated, so that instructions and data can be accessed simultaneously. (3) The chip has fast RAMs, so that programs and data can be accessed simultaneously between two blocks through an independent data bus. (4) The chip provides hardware supports with low-overhead or no-overhead loops and jumps. (5) The chip provides fast interrupt handling and hardware I/O support. (6) The chip has a multiple of hardware address generators operated in a single cycle. (7) The chip can execute a multiple of operations simultaneously. (8) The chip supports pipeline operations, so that the operations of fetching, decoding, and executing operations can be executed at the same time.

According to data format, the DSP chip can be divided into the following types. The DSP chip using data of a fixed point format for the operation is called a fixed-point DSP chip such as TI's TMS320C1X/C2X, TMS320C2XX/C5X, and TMS320C54X/C62XX series, AD's ADSP21XX series, AT&T's DSP16/16A series, Motorola's MC56000 series, etc. The DSP using data of a floating point format for the operation is called a floating-point DSP chip such as TI's TMS320C3X/C4X/C8X series, AD's ADSP21XXX series, AT&T's DSP32/32C series, Motorola's MC96002 series, etc.

Different floating-point DSP chips adopt different floating-point formats, and some DSP chips adopt a self-defined floating point format such as the TMS320C3X, and some DSP chips adopt the IEEE standard floating point format such as Motorola's MC96002, FUJITSU's MB862325, ZORAN's ZR35325, etc.

The face detection-based bulb type alarm lamp of the present invention can overcome the issue of the conventional alarm lamp which is unable to use the police accessory tools such as the explosion-proof net. The invention further integrates can the folding mounting base, the explosion-proof net container, and the releasing device into the conventional alarm lamp hardware to achieve the effects of confirming a criminal's relative direction and position, releasing the explosion-proof net to arrest the criminal automatically, confirming whether or not a criminal appears in the neighborhood by specified image processing devices, and confirming the relative direction and distance of the criminal when the criminal shows up.

All technical characteristics of this embodiment may be combined freely according to actual requirements. While the present invention has been described by means of specific embodiments, numerous modifications and variations could be made thereto by those skilled in the art without departing from the scope and spirit of the present invention set forth in the claims.

What is claimed is:

1. A face detection-based bulb type alarm lamp, comprising a folding mounting base, an explosion-proof net container, a releasing device, a red bulb, a blue bulb and a DSP controller, wherein the folding mounting base is provided for fixing the red bulb and the blue bulb; the explosion-proof net container is provided for containing an explosion-proof net; the releasing device is disposed at a rear end of the explosion-proof net container and provided for releasing the explosion-proof net contained in the explosion-proof net container according to an emission control signal produced by the DSP controller when the emission control signal is received by the releasing device; wherein, the DSP controller is provided for controlling the folding mounting base, the explosion-proof net container, the releasing device, the red bulb, and the blue bulb; and the folding mounting base comprises a folding element and a box, the folding element of the folding mounting base is provided for folding or unfolding the folding mounting base to switch between a folded status and an unfolded status of the folding mounting base, and the explosion-proof net container and the releasing device are embedded into the box of the folding mounting base;

the DSP controller is provided for controlling the folding mounting base, the explosion-proof net container, the releasing device, the red bulb and the blue bulb, which includes controlling a switch between the folded status and the unfolded status of the folding mounting base;

the DSP controller is provided for controlling the folding mounting base, the explosion-proof net container, the releasing device, the red bulb and the blue bulb, which includes controlling the flashing frequency of the red bulb and the flashing frequency of the blue bulb;

the DSP controller is provided for controlling the folding mounting base, the explosion-proof net container, the releasing device, the red bulb and the blue bulb, which includes controlling the releasing device to confirm whether or not the explosion-proof net contained in the explosion-proof net container is released;

and the face detection-based bulb type alarm lamp further comprising:

a video capture device, embedded into a casing of the box of the folding mounting base, for collecting video data around the alarm lamp to obtain a high definition video stream;

an edge enhancement device, coupled to the video capture device, for executing an edge enhanced image of a new frame image whenever the new frame image of the high definition video stream is received, so as to obtain a new enhanced image of the high definition video stream;

a wavelet filter device, coupled to the edge enhancement device, for carrying out a Daubechies wavelet filter processing of a new enhanced image of the high definition video stream whenever the new enhanced image of the high definition video stream is received, so as to obtain a new filtered image of the high definition video stream;

wherein, the Daubechies wavelet filter processing carried out by the wavelet filter device comprises: using a Daubechies wavelet with a length of 4 to carry out a level 3 decomposition of the new enhanced image of the high definition video stream and then a wavelet reconstruction to obtain a new filtered image of the high definition video stream;

a background splitting device, coupled to the wavelet filter device, for, whenever the new filtered image of the high definition video stream is received, processing each pixel of the new filtered image as a target pixel as follows:

confirming whether or not the pixel value of the target pixel is matched with the pixel value of the pixel situated at a corresponding position of the foreground and background images; if yes, then using the target pixel as a background point, or else using the target pixel as a non-background point, calculating the probability of the pixel point at a corresponding position of the target pixel of the previous images in the high definition video stream being a background point, and if the probability is greater than or equal to the threshold of the predetermined probability, using the pixel value of the target pixel at the corresponding position in the previous images being confirmed as the background point to update the pixel value of the target pixel at a corresponding position in the foreground and background images;

outputting an updated background image, after the background splitting device has executed the aforementioned processing of the last pixel in the new filtered image;

a target identification device, coupled to the background splitting device, for subtracting the updated background image based on the new filtered image of the high definition video stream from the new filtered image of the high definition video stream to obtain a foreground image, matching a target in the foreground image based on the characteristics of a predetermined human color bar chart to confirm whether or not the target is a human target in the foreground image, and outputting a human sub-image corresponding to the human target and split from the foreground image;

wherein, the DSP controller is provided for receiving the human sub-image output by the target identification device, and confirming whether or not the human sub-image includes a person's facial feature, and if the human sub-image includes the person's facial feature, confirming an emission direction based on a relative position of the foreground image of the human sub-image, confirming an emission intensity based on the depth of field of the foreground image of the human sub-image, and the DSP controller packing the emission direction and the emission intensity to form the emission control signal.

2. The face detection-based bulb type alarm lamp according to claim 1, wherein the folding mounting base is disposed at the top of a police car.

3. The face detection-based bulb type alarm lamp according to claim 2, wherein the DSP controller is installed in a frontend dashboard of a police car.

4. The face detection-based bulb type alarm lamp according to claim 3, wherein the DSP controller is provided for controlling the folding mounting base, the explosion-proof net container, the releasing device, the red bulb and the blue bulb, and the sum of the flashing frequency of the red bulb and the flashing frequency of the blue bulb is a predetermined value.

5. The face detection-based bulb type alarm lamp according to claim 4, wherein the folding mounting base further comprises a fastener, and the fastener of the folding mounting base is provided for fixing the folding mounting base to the top of a police car.

* * * * *